United States Patent
Vysyaraju et al.

(10) Patent No.: US 7,830,456 B1
(45) Date of Patent: Nov. 9, 2010

(54) SYSTEM AND METHOD FOR FREQUENCY MULTIPLEXING IN DOUBLE-CONVERSION RECEIVERS

(75) Inventors: Rajah Vysyaraju, Princeton, NJ (US); Julio Canelo, Englewood, NJ (US); Charles Armour, Monmouth Junction, NJ (US); John Bayruns, Bridgewater, NJ (US); Hakan Leblebicioglu, Millington, NJ (US)

(73) Assignee: Anadigics, Inc, Warren, NJ (US)

( * ) Notice: Subject to any disclaimer, the term of this patent is extended or adjusted under 35 U.S.C. 154(b) by 1195 days.

(21) Appl. No.: 11/446,337

(22) Filed: Jun. 2, 2006

(51) Int. Cl.
  *H04N 5/46* (2006.01)
(52) U.S. Cl. .................................................. 348/725
(58) Field of Classification Search ................. 348/731, 348/725, 726, 441, 552–553, 558; 455/188.1, 455/189.1, 150.1
  See application file for complete search history.

(56) References Cited

U.S. PATENT DOCUMENTS

| | | | | |
|---|---|---|---|---|
| 4,726,072 A * | 2/1988 | Yamashita et al. | ....... | 455/189.1 |
| 5,014,349 A * | 5/1991 | Kubo et al. | ............... | 455/189.1 |
| 6,118,499 A | 9/2000 | Fang | | |
| 6,151,488 A * | 11/2000 | Brekelmans | ............. | 455/150.1 |
| 6,438,361 B1 * | 8/2002 | Chong et al. | ............. | 455/188.1 |
| 6,725,463 B1 * | 4/2004 | Birleson | ..................... | 725/151 |
| 6,909,470 B2 * | 6/2005 | Mizukami et al. | ........... | 348/726 |
| 2002/0047942 A1 | 4/2002 | Vorenkamp et al. | | |
| 2003/0071925 A1* | 4/2003 | Kanno et al. | ................. | 348/726 |
| 2005/0155082 A1* | 7/2005 | Weinstein et al. | ........... | 725/131 |
| 2006/0066759 A1* | 3/2006 | Ikuma et al. | ................ | 348/735 |
| 2006/0116098 A1* | 6/2006 | Oba et al. | .................... | 455/313 |
| 2007/0274730 A1* | 11/2007 | Koo et al. | .................... | 398/163 |

\* cited by examiner

*Primary Examiner*—Paulos M Natnael
(74) *Attorney, Agent, or Firm*—William L. Botjer

(57) ABSTRACT

A system and method for frequency conversion in a frequency-conversion receiver is disclosed. The frequency-conversion receiver receives input RF signals carrying multiple channels. The frequency-conversion receiver converts the input RF signals to a wide IF band. The IF band is further processed by dividing the IF band into one or more frequency segments or by selecting a wideband frequency segment from the IF band. The wideband frequency segment or the one or more frequency segments are further down-converted, filtered and amplified to provide desired output IF signals, based on the number of channels required in the output IF signals.

26 Claims, 8 Drawing Sheets

SYSTEM AND METHOD FOR FREQUENCY MULTIPLEXING IN DOUBLE-CONVERSION RECEIVERS

BACKGROUND OF THE INVENTION

The present invention generally relates to the field of frequency-conversion receivers. More specifically, it relates to a system and method for frequency multiplexing in frequency-conversion receivers.

Frequency-conversion receivers are used in various electronic devices, such as televisions (TV), radios for transmission and reception of RF signals at particular frequencies. A frequency-conversion receiver receives transmitted signals for example, a band of radio frequency (RF) signals carrying multiple channels and converts the RF signals to signals of a different frequency. The frequency-conversion receiver processes these transmitted signals to provide the desired output signals to the demodulator. The demodulator demodulates the desired output signals to extract information. Examples of frequency-conversion receivers include a heterodyne receiver, a super heterodyne receiver, a double-conversion receiver, and the like.

The frequency-conversion receiver includes a mixer and a filter. The mixer converts the band of RF signals to an intermediate frequency (IF) signal. The IF signal is filtered by using the filter and amplified to provide the desired output IF signal. The filtering removes unwanted signals that need to be rejected from the output IF signals. Examples of filters include SAW filters, variable band pass filters and the like. Since IF signals are easy to filter, amplify and process, the RF signals are converted to IF signals. However, the available IF filters have low bandwidth, which restricts the frequency conversion of wideband IF signals. To process wideband IF signals wide-bandwidth filters are needed, which have high insertion loss. High insertion loss filters cause poor signal-to-noise ratio, which limits the lower end of receiver dynamic range. Further, the processing of wideband signals cause high inter-modulation distortion, which sets the limit on the high end of receiver dynamic range. In light of the foregoing discussion, there is a need for a system and method for frequency conversion that allows transmission of large number of channels (i.e. have a wide bandwidth) with minimum noise and distortion.

SUMMARY OF THE INVENTION

An object of the invention is to allow processing of a large number of channels.

Another object of the invention is to reduce inter-modulation distortion under large number of output channels.

Yet another object of the invention is to achieve a high linearity with wideband output signals.

Still another object of the invention is to save power when a lesser number of channels are used.

To achieve the above-mentioned objectives, various embodiments of the invention provide a system and method for frequency conversion in frequency-conversion receivers. A frequency-conversion receiver includes an up-conversion mixer, one or more down-conversion mixers, a plurality of filters and a plurality of amplifiers. The frequency-conversion receiver receives input RF signals carrying multiple channels. The input RF signals are up-converted to a first IF band by using the up-conversion mixer.

In an embodiment, the first IF band is divided into one or more frequency segments using multiple narrowband filters. The one or more frequency segments are then down-converted and amplified to second IF segments by mixing the one or more frequency segments with a fixed local oscillator frequency signal. The second IF segments are added and further amplified and filtered to provide the desired output IF signal. A control switch may also be used to switch the one or more frequency segments to an 'on' or an 'off' state, based on the channels required in the desired output IF signals.

In another embodiment, the first IF band is divided into one or more frequency segments using multiple narrowband filters. The one or more frequency segments are then down-converted and amplified to same second IF segments by mixing one or more frequency segments with different local oscillator frequency signals. Each second IF segment is further amplified and filtered to provide the desired output IF signals. A control switch may also be used to switch the one or more frequency segments to an 'on' or an 'off' state, based on the channels required in the desired output IF signals.

In yet another embodiment, a wideband frequency segment is selected from the first IF band using a wideband filter, which is a parallel combination of multiple narrowband filters with offset center frequencies. The wideband frequency segment is then down-converted to a second IF segment by using a wide band down-conversion mixer. The second IF segment is further filtered and amplified to provide the desired output IF signals.

The use of multiple narrowband low insertion loss filters in each frequency segment allows the transmission of a large number of channels with optimum signal-to-noise ratio and having multiple down-conversion paths reduces the inter-modulation distortion. Wideband frequency conversion is achieved by placing multiple narrow bandwidth filters in parallel or dividing the IF band into one or more frequency segments. Further, the frequency-conversion receiver architecture of the present invention provides rejection of unwanted signals. The frequency-conversion receiver architecture of the present invention also allows the use of either high performance or low performance-analog-to-digital converters in IF signal detection. Moreover, the control switch of the frequency-conversion receiver architecture also helps in saving power by switching the frequency segments not in use to an 'off' state. Moreover, the wideband filter, which includes multiple narrowband filters, made on a single substrate, helps in minimizing process and temperature variations.

BRIEF DESCRIPTION OF THE DRAWINGS

Embodiments of the invention will hereinafter be described in conjunction with the appended drawings provided to illustrate and not to limit the invention, wherein like designations denote like elements, and in which.

DESCRIPTION OF PREFERRED EMBODIMENTS

Various embodiments of the invention provide a system and method for frequency conversion in a frequency-conversion receiver. The frequency-conversion receiver receives input RF signals carrying multiple channels. The frequency-conversion receiver allows processing of multiple channels by converting the input RF signals to an IF band. The IF band is then processed and further down-converted, filtered and amplified, according to the required channels for the desired final output IF signals.

Figure 1:
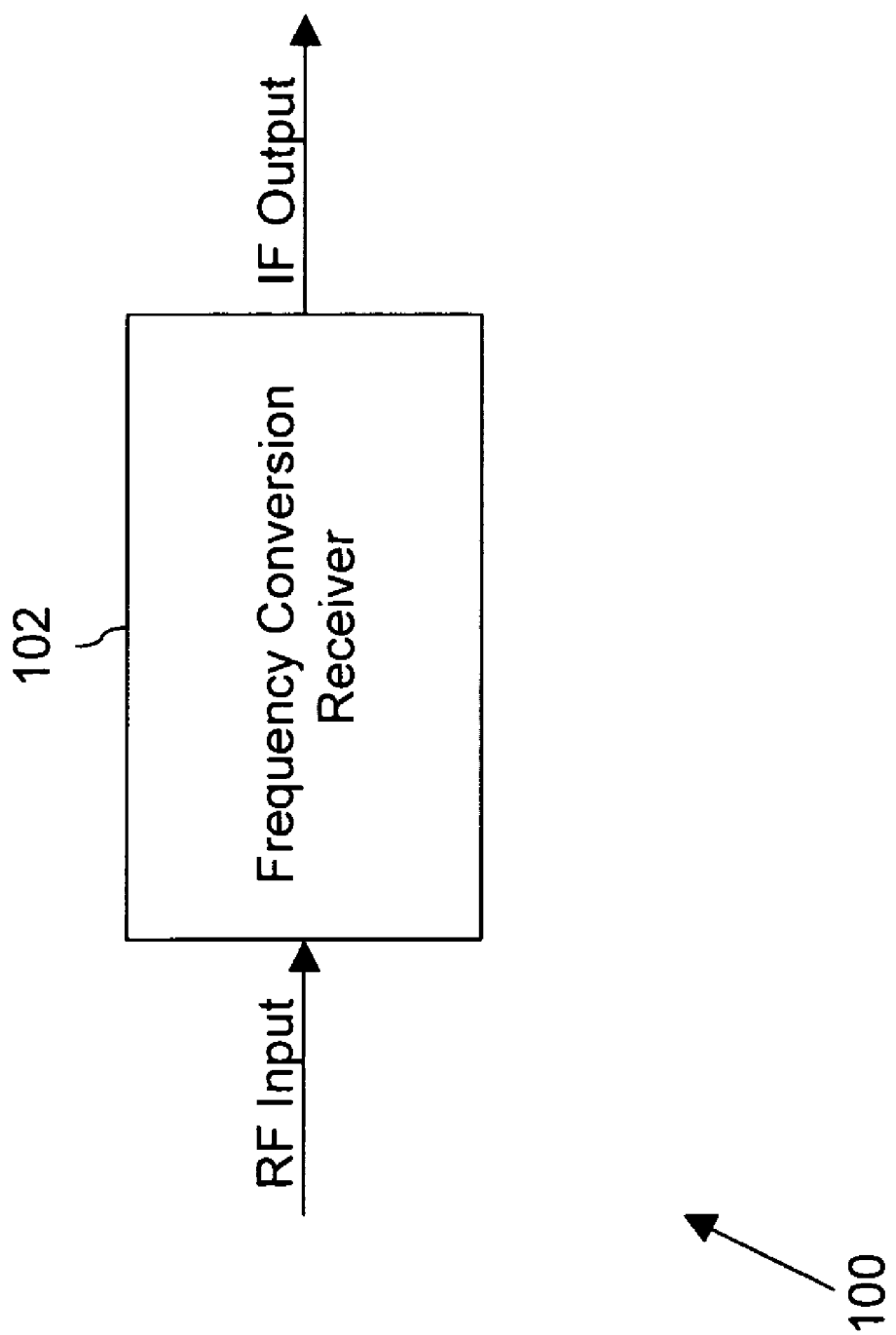
FIG. 1 is a block diagram of an environment in which various embodiments of the invention may be practiced.

FIG. 1 is a block diagram of an environment 100 in which various embodiments of the invention may be practiced. Environment 100 includes a frequency-conversion receiver 102. Frequency-conversion receiver 102 converts the input RF signals to desired output IF signals. Frequency-conversion receiver 102 performs frequency multiplexing to provide frequency signals carrying multiple channels. The desired output IF signals are further provided to a demodulator. The demodulator, for example, an analog-to-digital converter, demodulates the desired output IF signals to extract the base band information.

In various embodiments of the invention, the input RF signals are broadband signals, for example, multi-octave input RF signals. In various embodiments of the invention, the input broadband RF signals are supplied through a Community Access Television (CATV) infrastructure.

Examples of environment 100 include a television tuner, a radio tuner, and the like. Examples of frequency-conversion receiver 102 include a heterodyne receiver, a super heterodyne receiver, a double conversion receiver, and the like. Frequency-conversion receiver 102 is explained in conjunction with FIGS. 2, 3 and 4.

Figure 2:
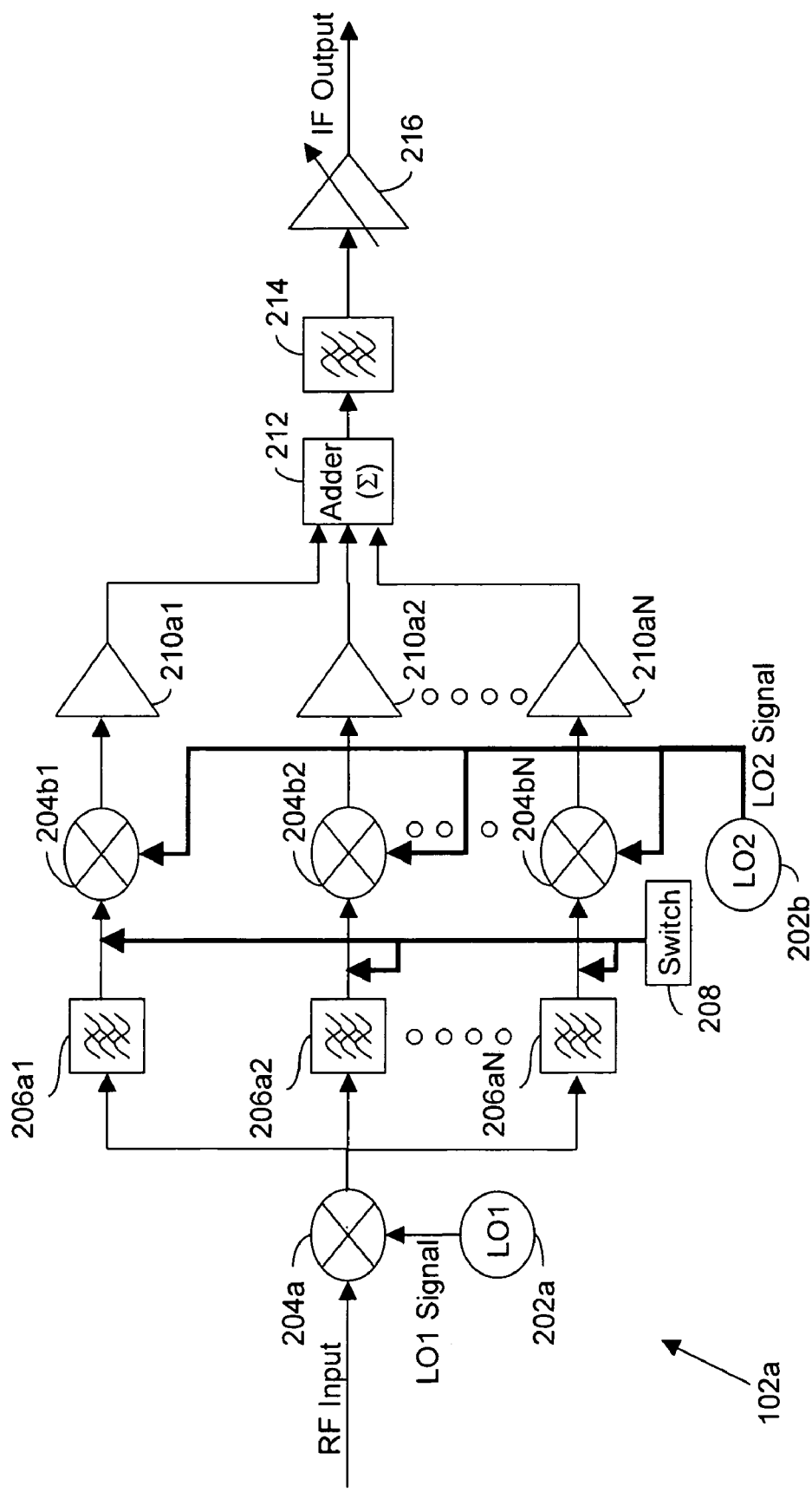
FIG. 2 is a schematic representation of a frequency-conversion receiver, in accordance with an embodiment of the invention.

FIG. 2 is a schematic representation of a frequency-conversion receiver 102a, in accordance with an embodiment of the invention. Frequency-conversion receiver 102a includes a first local oscillator 202a, a second local oscillator 202b, an up-conversion mixer 204a, a plurality of down-conversion mixers such as a down-conversion mixer 204b1, a down-conversion mixer 204b2 and a down-conversion mixer 204bN, a plurality of first filters such as a first filter 206a1, a first filter 206a2 and a first filter 206aN, a control switch 208, a plurality of amplifiers such as an amplifier 210a1, an amplifier 210a2 and an amplifier 210aN, an adder 212, a second filter 214 and a voltage-controlled gain amplifier 216.

First local oscillator 202a provides a first local oscillator frequency signal to up-conversion mixer 204a. Up-conversion mixer 204a up-converts the input RF signals to a first IF band having center frequency as a first IF, by mixing the input RF signals with the first local oscillator frequency signal. First filters 206a1, 206a2 and 206aN divide the first IF band into one or more frequency segments, based on their bandwidth and center frequency. For example, first filter 206a1 with a bandwidth of about 30 MHz and at a center frequency of about 1245 MHz provides a frequency segment in the range of about 1230 MHz to 1260 MHz. Down-conversion mixers 206b1, 206b2 and 206bN down-convert the one or more frequency segments to second IF segments by mixing them with a second local oscillator frequency signal provided by second local oscillator 202b. Each down-conversion mixer utilizes the same local oscillator frequency signal. Amplifiers 210a1, 210a2 and 210aN amplify the second IF segments. Adder 212 adds the second IF segments to generate an added wideband second IF segment. Second filter 214 filters the added wideband second IF segment to remove noise and unwanted signals. Voltage-controlled gain amplifier 216 amplifies the added wideband second IF segment to provide the desired output IF signal.

In an embodiment of the invention, control switch 208 may switch the one or more frequency segments to 'on' or 'off' states. For example, unused frequency segments may be switched to an 'off' state and therefore, are not processed any further. The selection of frequency segments that need to be switched to an 'off' state depends on the channels required at the output. For example, if the channels included in a frequency segment with the frequency in the range of about 1290 MHz to 1320 MHz are not required at the output, then control switch 208 switches the frequency segment to an 'off' state. The switching of the one or more frequency segments those are not in use, to an 'off' state helps in saving power.

In an embodiment of the invention, first local oscillator 202a and second oscillator 202b are voltage-controlled oscillators that provide the frequency-shifting signals to up-conversion mixer 204a, and down-conversion mixers 204b1, 204b2 and 204bN, respectively. The first and the second local oscillator signals have different frequencies. Up-conversion mixer 204a and down-conversion mixers such as down-conversion mixer 204b1 mix the input signals with the frequency-shifting signals, to provide the sum of input signals and local oscillator signals, as well as the difference between the two. Examples of up-conversion mixer 204a, and down-conversion mixers 204b1, 204b2 and 204bN include diode mixers, Gilbert cell mixers, diode ring mixers, switching mixers, and the like.

In an embodiment of the invention, first filters 206a1, 206a2 and 206aN are narrowband saw filters. In an embodiment of the invention, the number of first filters may vary depending on the number of channels required. The number of down-conversion mixers and amplifiers also varies, based on number of first filters. In an embodiment of the invention, second filter 214 may be a wideband Butterworth, Chebyshev or Elliptic filter and the like. Further, the bandwidth of second filter 214 and voltage-controlled gain amplifier 216 may vary in frequency-conversion receiver 102, depending on the number of channels required at the output. In an embodiment of the invention, multiple second local oscillators and multiple down-conversion mixers may be used for generating second IF segments having narrow bandwidth. Frequency-conversion receiver 102 with multiple second local oscillators and multiple down-conversion mixers has been explained in conjunction with FIG. 3.

Figure 3:
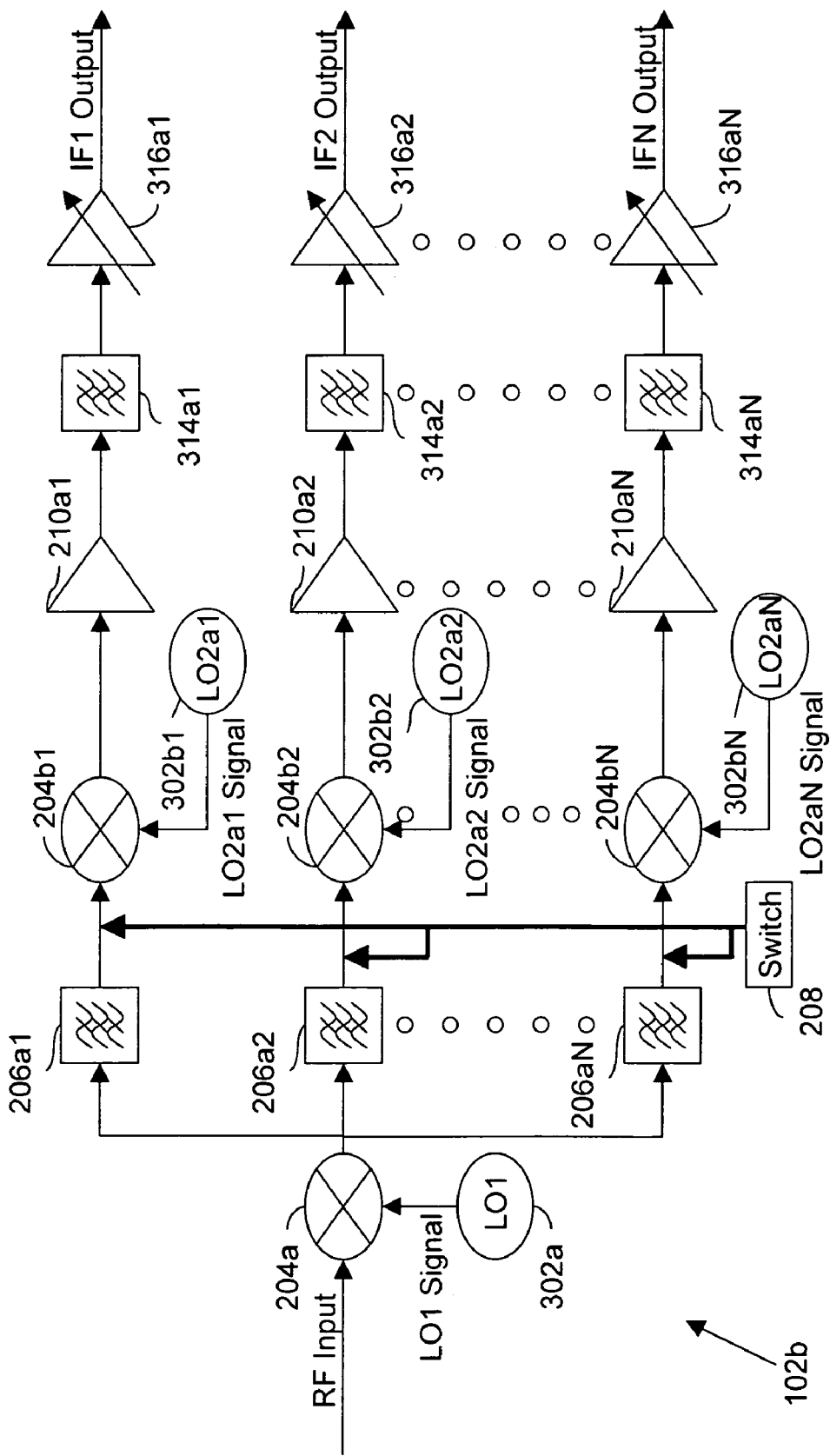
FIG. 3 is a schematic representation of a frequency-conversion receiver, in accordance with another embodiment of the invention.

FIG. 3 is a schematic representation of a frequency-conversion receiver 102b, in accordance with another embodiment of the invention. Frequency-conversion receiver 102b includes a first local oscillator 302a, a plurality of second local oscillators such as a second local oscillator 302b1, a second local oscillator 302b2 and a second local oscillator 302bN, up-conversion mixer 204a, down-conversion mixer 204b1, down-conversion mixer 204b2, down-conversion mixer 204bN, first filter 206a1, first filter 206a2, first filter 206aN, control switch 208, amplifier 210a1, amplifier 210a2, amplifier 210aN, a plurality of second filters such as a second filter 314a1, a second filter 314a2 and a second filter 314aN, a plurality of voltage-controlled gain amplifiers such as a voltage-controlled gain amplifier 316a1, a voltage-controlled gain amplifier 316a2 and a voltage-controlled gain amplifier 316aN. In frequency-conversion receiver 102b different second local oscillator frequencies are used for down-conversion.

First local oscillator 302a provides a first local oscillator frequency signal to up-conversion mixer 204a. Up-conversion mixer 204a up-converts the input RF signals to a first IF band having center frequency as a first IF, by mixing the input RF signals with the first local oscillator frequency signal. First filters 206a1, 206a2 and 206aN divide the first IF band into one or more frequency segments, based on their bandwidth and center frequency. The one or more frequency segments are then down-converted to second IF segments with the same bandwidth by using down-conversion mixers 204b1, 204b2 and 204bN. Down-conversion mixers 204b1, 204b2 and 204bN are narrowband mixers which down-convert the one or more frequency segments by mixing them with different second local oscillator frequency signals provided by second local oscillators 302b1, 302b2 and 302bN, respectively. Amplifiers 210a1, 210a2 and 210aN amplify the second IF segments. Second filters 314a1, 314a2 and 314aN filter the second IF segments to remove noise and unwanted signals. Voltage-controlled gain amplifiers 316a1, 316a2 and 316aN amplify the filtered second IF segments to provide the desired output IF signals to the analog-to-digital converters for demodulation and signal processing.

In the above architecture, due to the generation of multiple smaller IF segments, multiple lower performance analog-to-digital converters may be used for information extraction.

In an embodiment of the invention, control switch 208 may switch the one or more frequency segments in to an 'on' or an 'off' state. The switching of the one or more frequency segments that is not in use, to an 'off' state helps in saving power.

In an embodiment of the invention, first local oscillator 302a and second local oscillators 302b1, 302b2 and 302bN are voltage-controlled oscillators. In an embodiment of the invention, first filters 206a1, 206a2 and 206aN are narrowband saw filters. In an embodiment of the invention, the number of first filters may vary depending on the number of channels required. The number of second local oscillators, down-conversion mixers and amplifiers also varies, based on number of first filters. In an embodiment of the invention, second filters 314a1, 314a2 and 314aN may be narrowband Butterworth, Chebyshev or Elliptic filters and the like.

In an embodiment of the invention, only one wideband filter and one wideband down-conversion mixer may be used for down-conversion in frequency-conversion receiver 102, based on the bandwidth of the wideband filter and the wideband down-conversion mixer, and the number of channels required at the output. Frequency-conversion receiver 102 with one wideband filter and one wideband down-conversion mixer is explained in conjunction with FIG. 4.

Figure 4:
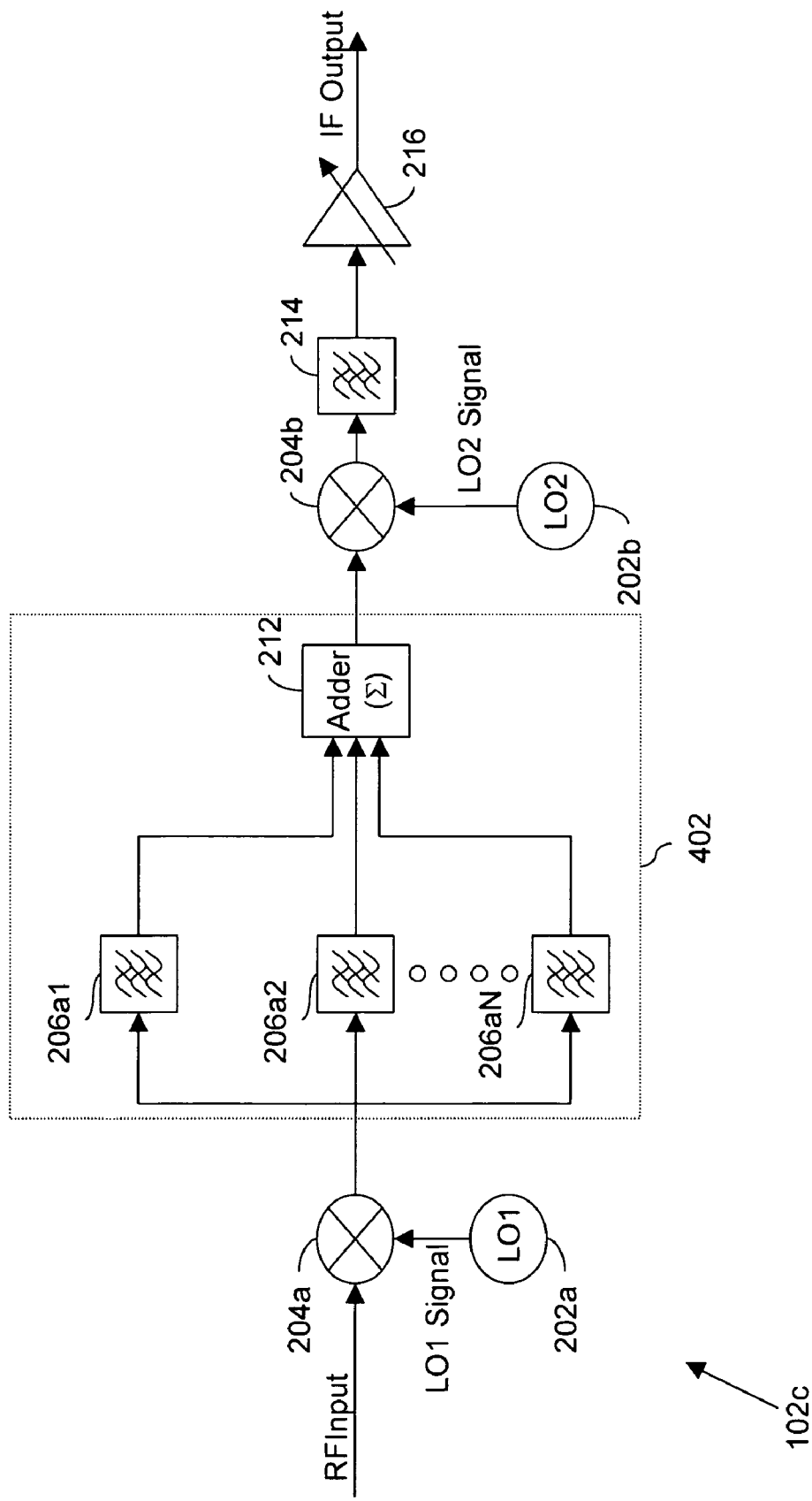
FIG. 4 is a schematic representation of a frequency-conversion receiver, in accordance with another embodiment of the invention.

FIG. 4 is a schematic representation of a frequency-conversion receiver 102c, in accordance with another embodiment of the invention. Frequency-conversion receiver 102c includes first local oscillator 202a, second local oscillator 202b, up-conversion mixer 204a, a wideband filter 402 including first filter 206a1, first filter 206a2, first filter 206aN and adder 212, down-conversion mixer 204b, second filter 214, and voltage-controlled gain amplifier 216.

First local oscillator 202a provides a first local oscillator frequency signal to up-conversion mixer 204a. Up-conversion mixer 204a up-converts the input RF signals to a first IF band having center frequency as a first IF, by mixing the input RF signals with the first local oscillator frequency signal. Wideband filter 402, which encompasses multiple narrowband first filters 206a1, 206a2 and 206aN with staggered center frequencies, selects a wideband frequency segment from the first IF band. Down-conversion mixer 204b down-converts the wideband frequency segment to a second wideband IF segment. Down-conversion mixer 204b down-converts the wideband frequency segment by mixing it with a second local oscillator frequency signal provided by second local oscillator 202b. Second filter 214 filters the second wideband IF segment to remove noise and unwanted signals. Voltage-controlled gain amplifier 216 amplifies the second wideband IF segment to provide the desired output IF signals to the analog-to-digital converters for demodulation and signal processing.

In an embodiment of the invention, wideband filter 402 is a parallel combination of first filters 206a1, 206a2 and 206aN with different center frequencies, which are offset properly to select the wideband frequency segment. First filters 206a1, 206a2 and 206aN are made on a single SAW substrate with minimum process and temperature variations and combined internally by using adder 212 to provide the wideband frequency segment. In an embodiment of the invention, first filters 206a1, 206a2 and 206aN may be combined externally by using adder 212. In an embodiment of the invention, first filters 206a1, 206a2 and 206aN are multiple narrowband saw filters paralleled to design wideband filter 402. The number of first filters may vary depending on the number of channels to be selected. In an embodiment of the invention, down-conversion mixer 204b is a wideband mixer.

Figure 5:
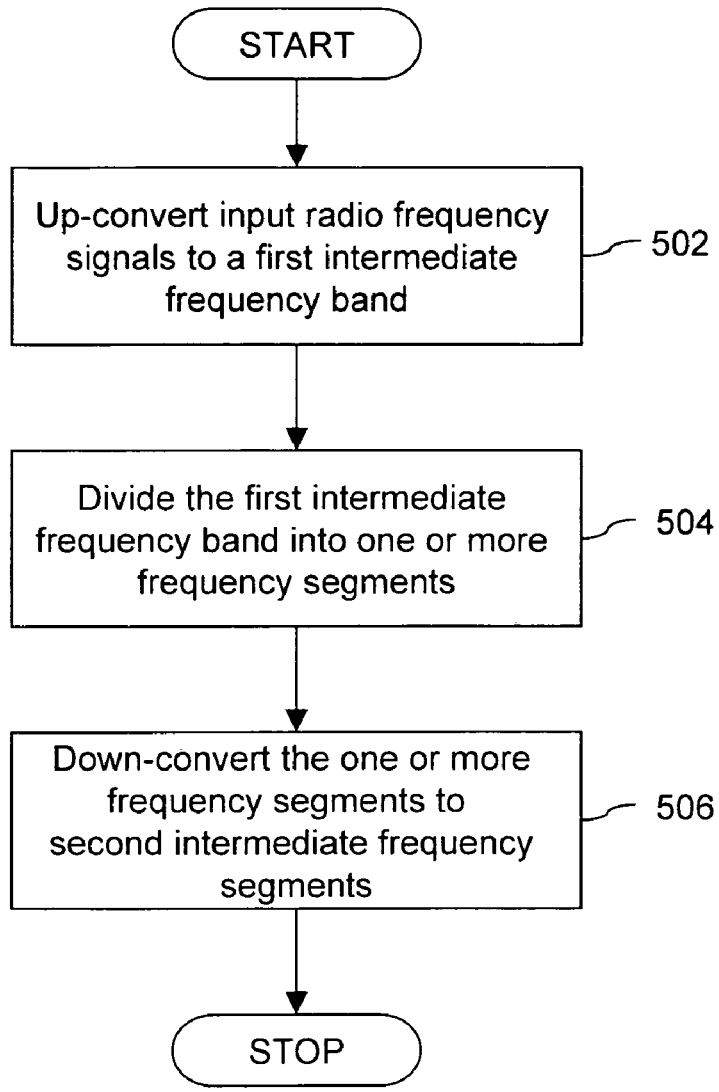
FIG. 5 is a flowchart, illustrating a method for frequency conversion in frequency-conversion receivers, in accordance with various embodiments of the invention.

FIG. 5 is a flowchart, illustrating a method for frequency conversion in frequency-conversion receivers, in accordance with various embodiments of the invention. At step 502, the input RF signals are up-converted to a first IF band having center frequency as a first IF, by mixing the input RF signals with a first local oscillator frequency signal. At step 504, the first IF band is divided into one or more frequency segments by using multiple filters such as first filters 206a1, 206a2 and 206aN. The division is based on the bandwidth of the filters as explained in detail in conjunction with example of FIGS. 6 and 7.

Thereafter, at step 506, the one or more frequency segments are down-converted to second IF segments by mixing the one or more frequency segments with second local oscillator frequency signals. The frequencies of second IF segments are lower than the frequencies of the one or more frequency segments. The second IF segments are further processed, based on the number of channels required at the output. The various ways in which the second IF segments are further processed have been explained in conjunction with FIGS. 6 and 7.

Figure 6:
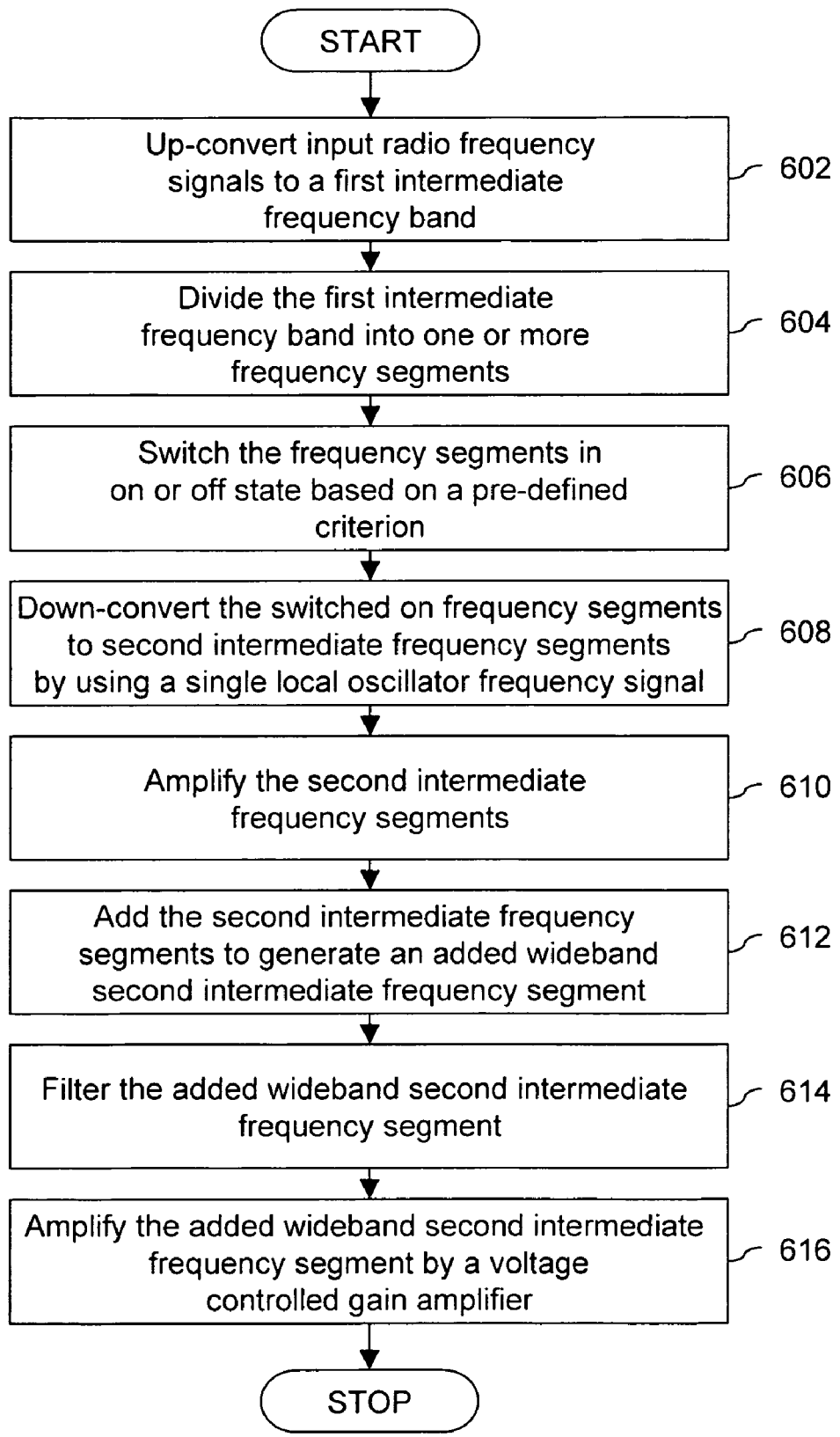
FIG. 6 is a flowchart, illustrating a method for frequency conversion in a frequency-conversion receiver, in accordance with an embodiment of the invention.

FIG. 6 is a flowchart, illustrating a method for frequency conversion in frequency-conversion receiver 102a, in accordance with an embodiment of the invention. At step 602, the input RF signals are up-converted to a first IF band. The input RF signals are up-converted by mixing the input RF signals with a first local oscillator frequency signal. At step 604, the first IF band is divided into one or more frequency segments by using multiple filters.

At step 606, the one or more frequency segments are switched to an 'on' or an 'off' state by a control switch, based on a pre-defined criterion. The pre-defined criterion is determined from the channels required at the output. For example, if the channels included in a frequency segment with the frequency in the range of about 1290 MHz to 1320 MHz are not required at the output, then the control switch switches the frequency segment to an 'off' state by sending a control signal.

At step 608, the one or more frequency segments that are switched to an 'on' state are down-converted to second IF segments. The one or more frequency segments are down-converted by mixing them with same second local oscillator frequency signals. The frequencies of the second IF segments are lower than the frequencies of the one or more frequency segments. At step 610, amplifiers amplify the second IF segments if the IF signals are too weak for the second IF filter. At step 612, the second IF segments are added to generate an added second IF segment. The added second IF segment is a wideband IF segment. At step 614, second filter such as second filter 214, filters the added second IF segment to remove the noise and unwanted signals. At step 616, voltage-controlled gain amplifier amplifies the added second IF segment to provide the desired output IF signal.

The method described above is explained with the help of the following example. The input RE signals with the frequency in the range of about 54 MHz to 1000 MHz have multiple cable channels. Each channel is 6 MHz wide. The input RF signals are up-converted to a first IF band with a center frequency of about 1280 MHz. The up-conversion is carried out by mixing the multi-octave RF signals with the first local oscillator frequency signal in the range of about 1384 MHz to 2230 MHz. The first IF band is divided into one or more frequency segments by using three saw filters. Each saw filter has a bandwidth of about 30 MHz. The first saw filter at a center frequency of about 1245 MHz, divides the first IF band into a frequency segment with the frequency in the range of about 1230 MHz to 1260 MHz. The second saw filter at a center frequency of about 1275 MHz divides the first IF band into the frequency segment with the frequency in the range of about 1260 MHz to 1290 MHz. The third saw filter at a center frequency of about 1305 MHz divides the first IF band into the frequency segment with the frequency in the range of about 1290 MHz to 1320 MHz. The number of channels in each of the one or more frequency segments is five. The total number of channels in the one or more frequency segments is 15. If the number of channels required at the output is less, for example 10 channels are required, the frequency segment with the frequency in the range of about 1230 MHz to 1260 MHz and the frequency segment with the frequency in the range of about 1260 MHz to 1290 MHz are switched to an 'on' state and the frequency segment with the frequency in the range of about 1290 MHz to 1320 MHz is switched to an 'off' state.

The one or more frequency segments switched to an 'on' state are down-converted to second IF segments by mixing the one or more frequency segments with a fixed second local oscillator frequency signal of about 1210 MHz. The frequency segment with the frequency in the range of about 1230 MHz to 1260 MHz is down-converted to second IF segment with the frequency in the range of about 20 MHz to 50 MHz. The frequency segment with the frequency in the range of about 1260 MHz to 1290 MHz is down-converted to second IF segment with frequency in the range of about 50 MHz to 80 MHz. The second IF segments are amplified by using amplifiers. The second IF segments are added to generate an added wideband second IF segment with the frequency in the range of about 20 MHz to 80 MHz. The number of channels in the added wideband second IF segment is 10. A second filter with a bandwidth of about 60 MHz and center frequency of about 50 MHz filters the added wideband second IF segment with the frequency in the range of about 20 MHz to 80 MHz. A voltage-controlled gain amplifier amplifies the added wideband second IF segment carrying 10 channels to provide the desired output IF signal to a demodulator.

The demodulator may include an analog-to-digital converter for demodulation and signal processing to extract the base band information from the desired output IF signal. The analog-to-digital converter used is of high performance for extracting information from large frequency segments. For small frequency segments, low performance analog-to-digital converters are used with a different down-conversion method. This method has been explained in conjunction with FIG. 7.

Figure 7:
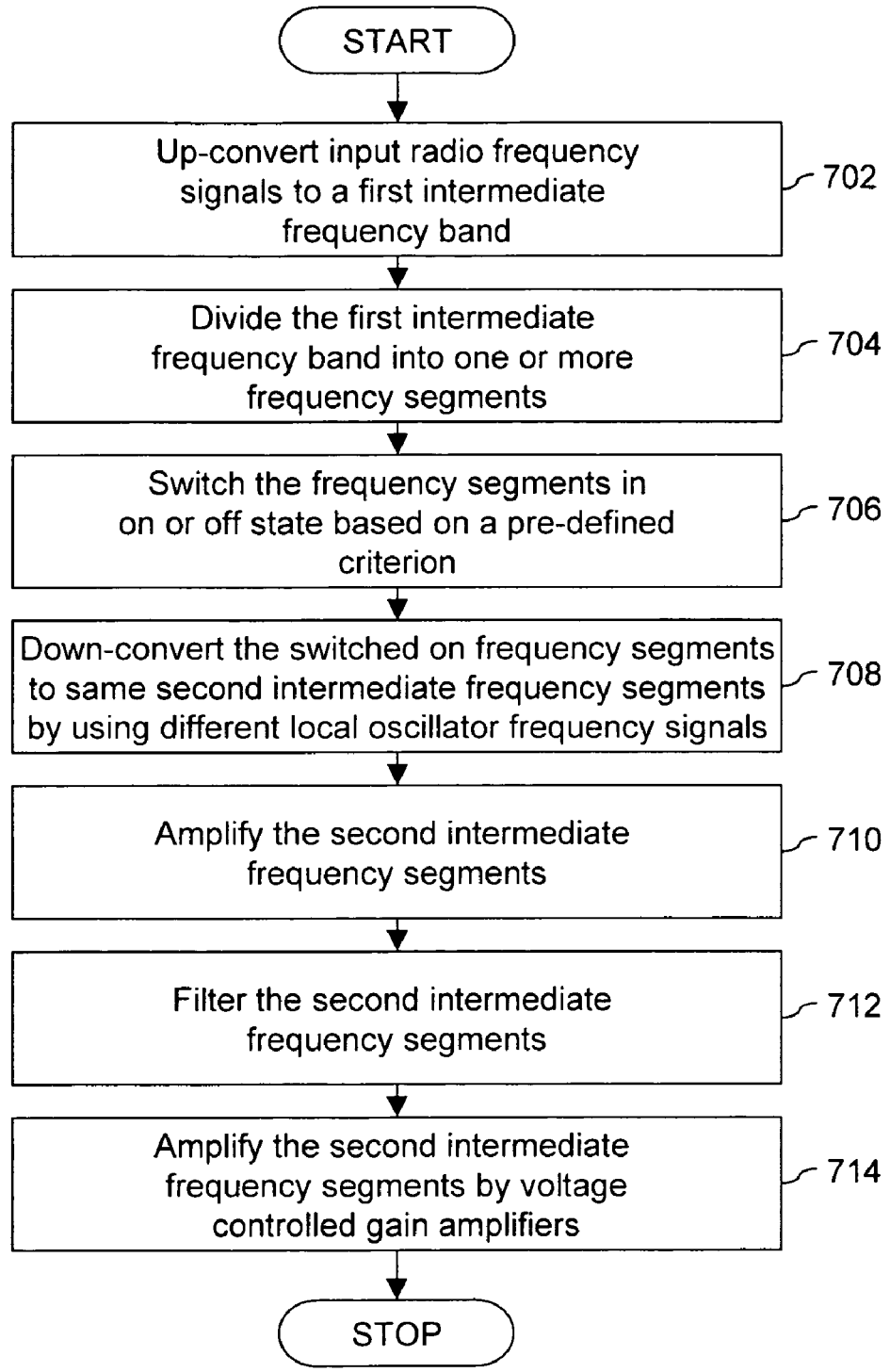
FIG. 7 is a flowchart, illustrating a method for frequency conversion in a frequency-conversion receiver, in accordance with another embodiment of the invention.

FIG. 7 is a flowchart, illustrating a method for frequency conversion in frequency-conversion receiver 102b, in accordance with another embodiment of the invention. At step 702, the input RF signals are up-converted to a first IF band. The input RF signals are up-converted by mixing the input RF signals with a first local oscillator frequency signal. At step 704, the first IF band is divided into one or more frequency segments. The division is based on the bandwidth of the filters. At step 706, the one or more frequency segments are switched to an 'on' or an 'off' state by a control switch such as control switch 208, based on a pre-defined criterion. The pre-defined criterion is determined from the channels required at the output.

At step 708, the one or more frequency segments that are switched to an 'on' state are down-converted to the second IF segments with the same final IF. The frequencies of the same second IF segments are lower than the frequencies of the one or more frequency segments. The one or more frequency segments are down-converted by mixing them with different second local oscillator frequency signals.

At step 710, amplifiers amplify the second IF segments if IF signals are too weak for second IF filter. At step 712, second filters filter the second IF segments. At step 714, voltage-controlled gain amplifiers amplify the second IF segments to provide the desired output IF signals.

FIG. 7 has been further exemplified as follows. As discussed in conjunction with FIG. 6, the frequency segment with the frequency in the range of about 1230 MHz to 1260 MHz is down-converted to a second IF segment with the frequency in the range of about 20 MHz to 50 MHz by mixing the frequency segment with a second local oscillator frequency signal of about 1210 MHz. The frequency segment with frequency in the range of about 1260 MHz to 1290 MHz is down-converted to the second IF segment with same final IF in the range of about 20 MHz to about 50 MHz, by mixing the frequency segment with a second local oscillator frequency signal of about 1240 MHz.

The above-mentioned second IF segments are then amplified by using amplifiers. There are five channels in each second IF segment. Each second IF segment is filtered by using second filters with a bandwidth of about 30 MHz and a center frequency of about 45 MHz filters the second IF segments. Voltage-controlled gain amplifiers amplify the second IF segments to provide the desired output IF signals to demodulators.

The demodulators may include analog-to-digital converters for demodulation and signal processing to extract the base band information from the desired output IF signals. The analog-to-digital converters with low performance are used, as frequency segment of the desired output IF signals are narrowband. Also, multiple similar analog-to-digital converters with low performance are used in all segments as all segments are down converted to the same output IF.

Figure 8:
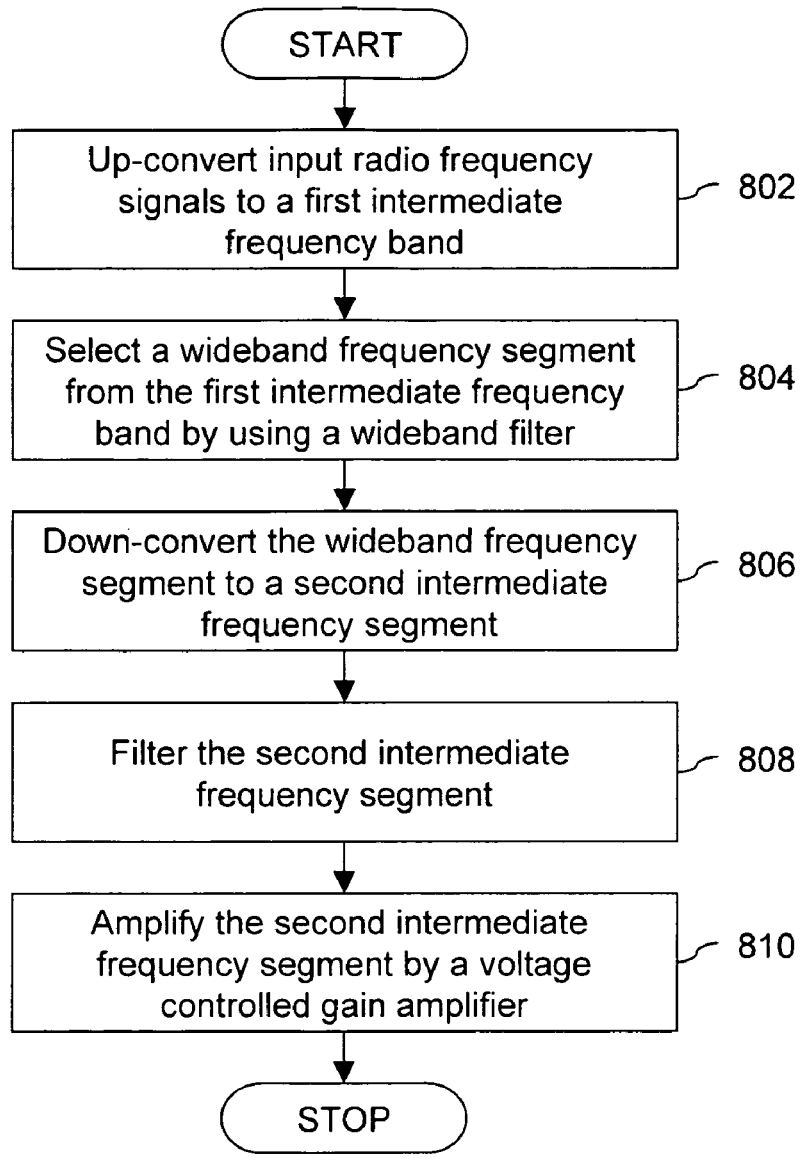
FIG. 8 is a flowchart, illustrating a method for frequency conversion in a frequency-conversion receiver, in accordance with another embodiment of the invention.

FIG. 8 is a flowchart, illustrating a method for frequency conversion in frequency-conversion receiver 102c, in accordance with another embodiment of the invention. At step 802, the input RF signals are up-converted to a first IF band having center frequency as a first IF. The input RF signals are up-converted by mixing the input RF signals with a first local oscillator frequency signal.

At step 804, a wideband frequency segment is selected from the first IF band. The selection is done by using a wideband filter such as wideband filter 402, which encompasses multiple narrowband filters with staggered center frequencies and combined internally or externally to provide the wideband frequency segment. The wideband frequency segment has the first IF as its center frequency. Thereafter, at step 806, the wideband frequency segment is down-converted to a second wideband IF segment by mixing the wideband frequency segment with a second local oscillator frequency signal. At step 808, the second filter filters the second wideband IF segment to remove noise and unwanted signals. At step 810, voltage-controlled gain amplifier amplifies the second wideband IF segment to provide the desired wideband output IF signal.

FIG. 8 is further explained as follows. The input RF signals with the frequency in the range of about 54 MHz to 1000 MHz have multiple cable channels. Each channel is 6 MHz wide. The input RF signals are up-converted to a first IF band with a center frequency of about 1280 MHz. The up-conversion is carried out by mixing the multi-octave RF signals with the first local oscillator frequency signal in the range of about 1384 MHz to 2230 MHz. A wideband filter, including three paralleled saw filters combined internally to provide a total bandwidth of about 100 MHz and with an offset center frequency of about 1280 MHz, selects a wideband frequency segment with the frequency in the range of about 1230 MHz to about 1330 MHz from the first IF band with a center frequency of about 1280 MHz. There are 16 channels in the wideband frequency segment. The wideband frequency segment is then down-converted to a second IF segment with the frequency in the range of about 25 MHz to 125 MHz by mixing the added frequency segment with a second local oscillator frequency signal of about 1205 MHz. A second filter, with a wide bandwidth of about 100 MHz and center frequency of about 75 MHz, filters the second IF segment with the frequency in the range of about 25 MHz to 125 MHz. A voltage-controlled gain amplifier amplifies the second IF segment carrying 15 channels to provide the desired output IF signal to a demodulator.

In the method described above, only one wideband filter and only one wideband down-conversion mixer is used. Further, the analog-to-digital converter used is of high performance for extracting information from large frequency segment with a large number of channels.

The system described above is equally applicable to radio tuners or systems having any first IF and second IF frequencies, including systems in which the IF frequencies are either higher or lower than the input frequencies, requiring either up-conversion or down-conversion.

Various embodiments of the invention provide a system and method for frequency conversion that allows the transmission of a large number of channels and achieves optimum rejection of unwanted signals. This is achieved by placing multiple low bandwidth filters in parallel or dividing the IF band into one or more frequency segments. Further, the frequency-conversion receiver architectures, as described in the invention, provide an optimum signal-to-noise ratio and also optimize the inter-modulation distortion and insertion loss. Moreover, the frequency-conversion receiver architectures allow the use of high performance and low performance analog-to-digital converters. Further, the control switch of the frequency-conversion receiver architectures helps in saving power by switching the frequency segment when not in use to an 'off' state. Moreover, the wideband filter, including multiple narrowband filters, made on a single substrate helps in minimizing process and temperature variations.

While the preferred embodiments of the invention have been illustrated and described, it will be clear that the invention is not limited to these embodiments only. Numerous modifications, changes, variations, substitutions and equivalents will be apparent to those skilled in the art without departing from the spirit and scope of the invention as described in the claims.

What is claimed is:

1. A frequency-conversion receiver for frequency conversion, the frequency-conversion receiver comprising:
   a. an up-conversion mixer, the up-conversion mixer up-converting radio frequency input signals to a first intermediate frequency band;
   b. a plurality of first filters, the plurality of first filters dividing the first intermediate frequency band into a plurality of first intermediate frequency segments;
   c. a plurality of down-conversion mixers, the plurality of down-conversion mixers down-converting the plurality of first intermediate frequency segments to a plurality of second intermediate frequency segments; and
   d. an adder, the adder adding the plurality of second intermediate frequency segments to generate an added second intermediate frequency segment.

2. The frequency-conversion receiver of claim 1 further comprising a first local oscillator, the first local oscillator providing a first local oscillator frequency signal to the up-conversion mixer.

3. The frequency-conversion receiver of claim 1 further comprising one or more second local oscillators, the one or more second local oscillators providing second local oscillator frequency signals to the plurality of down-conversion mixers.

4. The frequency-conversion receiver of claim 1 further comprising a plurality of amplifiers, the plurality of amplifiers amplifying the plurality of second intermediate frequency segments.

5. The frequency-conversion receiver of claim 1 further comprising one or more control switches for selectively switching the plurality of first intermediate frequency segments to an ON state or an OFF state based on a pre-defined criterion.

6. The frequency-conversion receiver of claim 1 further comprising a plurality of first voltage-controlled gain amplifiers, the plurality of first voltage-controlled gain amplifiers amplifying the second intermediate frequency segments.

7. The frequency-conversion receiver of claim 1 further comprising a second filter, the second filter filtering the added second intermediate frequency segment.

8. The frequency-conversion receiver of claim 1 further comprising a second voltage-controlled gain amplifier, the second voltage-controlled gain amplifier amplifying the added second intermediate frequency segment.

9. A frequency-conversion receiver for frequency conversion, the frequency-conversion receiver comprising:
   a. an up-conversion mixer, the up-conversion mixer up-converting radio frequency input signals to a first intermediate frequency band;
   b. a wideband filter, the wideband filter comprising:
      (i) a plurality of first filters connected in parallel, the plurality of first filters selecting a plurality of frequency segments from the first intermediate frequency band; and
      (ii) an adder, the adder combining the plurality of first filters to generate a wideband frequency segment; and
   c. a down-conversion mixer, the down-conversion mixer down-converting the wideband frequency segment to a second intermediate frequency segment.

10. The frequency-conversion receiver of claim 9 further comprising a first local oscillator, the first local oscillators providing a first local oscillator frequency signal to the up-conversion mixer.

11. The frequency-conversion receiver of claim 9, wherein the down-conversion mixer is a wideband mixer.

12. The frequency-conversion receiver of claim 9 further comprising a second local oscillator, the second local oscillator providing a second local oscillator frequency signal to the down-conversion mixer.

13. The frequency-conversion receiver of claim 9 further comprising a second filter, the second filter filtering the second intermediate frequency segment.

14. The frequency-conversion receiver of claim 9 further comprising a voltage-controlled gain amplifier, the voltage-controlled gain amplifier amplifying the second intermediate frequency segment.

15. A method for frequency conversion in frequency-conversion receivers, the method comprising the steps of:
   a. up-converting radio frequency input signals to a first intermediate frequency band;
   b. dividing the first intermediate frequency band into a plurality of first intermediate frequency segments;
   c. down-converting the plurality of first intermediate frequency segments to a plurality of second intermediate frequency segments; and
   d. adding the plurality of second intermediate frequency segments to generate an added second intermediate frequency segment.

16. The method of claim 15, wherein the step of up-converting comprises mixing the radio frequency input signals with a first local oscillator frequency signal.

17. The method of claim 15, wherein the step of down-converting comprises mixing the plurality of first intermediate frequency segments with second local oscillator frequency signals.

18. The method of claim 15 further comprising the step of selectively switching the plurality of first intermediate frequency segments to an ON state or an OFF state based on a pre-defined criterion.

19. The method of claim 15 further comprising the step of amplifying the plurality of second intermediate frequency segments.

20. The method of claim 15 further comprising the step of filtering the added second intermediate frequency segment.

21. The method of claim 15 further comprising the step of amplifying the added second intermediate frequency segment.

22. A method for frequency conversion in frequency-conversion receivers, the method comprising the steps of:
   a. up-converting radio frequency input signals to a first intermediate frequency band, wherein the first intermediate frequency band has a first intermediate frequency as center frequency;
   b. selecting a plurality of frequency segments from the first intermediate frequency band, wherein the plurality of frequency segments has the first intermediate frequency as center frequency;
   c. combining the plurality of frequency segments to generate a wideband frequency segment; and
   d. down-converting the wideband frequency segment to a second intermediate frequency segment.

23. The method of claim 22, wherein the step of up-converting comprises mixing the radio frequency input signals with a first local oscillator frequency signal.

24. The method of claim 22, wherein the down-converting step comprises mixing the wideband frequency segment with a second local oscillator frequency signal.

25. The method of claim 22 further comprising the step of filtering the second intermediate frequency segment.

26. The method of claim 22 further comprising the step of amplifying the second intermediate frequency segment.

* * * * *